(12) United States Patent
Gee

(10) Patent No.: US 6,995,588 B2
(45) Date of Patent: Feb. 7, 2006

(54) TEMPERATURE SENSOR APPARATUS

(75) Inventor: David Martin Gee, Manningtree (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/425,711

(22) Filed: Apr. 30, 2003

(65) Prior Publication Data
US 2004/0217783 A1 Nov. 4, 2004

(51) Int. Cl.
*H03K 5/22* (2006.01)
(52) U.S. Cl. .................... 327/83; 327/138; 327/262
(58) Field of Classification Search ............. 327/83, 327/138, 262, 378, 512, 513, 539
See application file for complete search history.

(56) References Cited

U.S. PATENT DOCUMENTS

| | | | | | |
|---|---|---|---|---|---|
| 5,886,515 | A | * | 3/1999 | Kelly | 323/313 |
| 6,028,472 | A | * | 2/2000 | Nagumo | 327/512 |
| 6,084,462 | A | * | 7/2000 | Barker | 327/512 |
| 6,147,548 | A | * | 11/2000 | Doyle | 327/539 |
| 6,686,797 | B1 | * | 2/2004 | Eker | 327/539 |

* cited by examiner

*Primary Examiner*—Tuan T. Lam
*Assistant Examiner*—Hiep Nguyen

(57) ABSTRACT

A temperature sensor apparatus comprises a pair of parallel circuit branches each including a pn semiconductor junction coupled in series to an impedance. The pn semiconductor junctions have different cross-sectional areas. An amplification stage comprises a CMOS input stage coupled respectively across each pn semiconductor junction and a FET transistor output stage (coupled to a load impedance) that generates an amplified output signal corresponding to the pn semiconductor junction temperature.

10 Claims, 1 Drawing Sheet

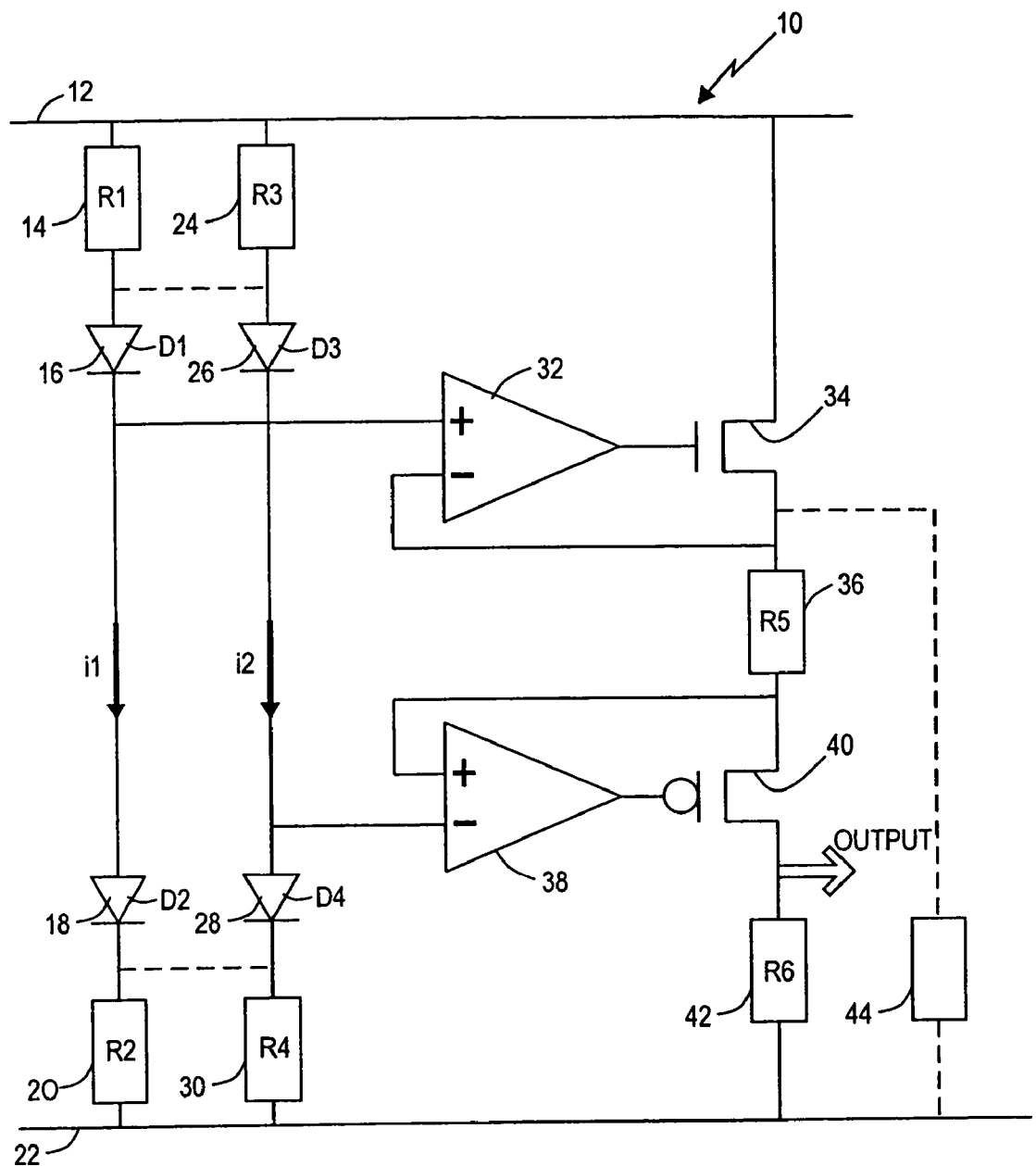

TEMPERATURE SENSOR APPARATUS

FIELD OF THE INVENTION

The present invention relates, in general, to a temperature sensor apparatus of a type, for example, that uses a pair of forward-biased pn semiconductor diodes as a temperature sensing element, so as to employ the so-called $V_T$ current density method of temperature measurement.

DESCRIPTION OF THE BACKGROUND ART

Sensing a change in ambient temperature is a fundamental requirement of many electronic applications employing integrated circuits. For example, it can be essential to monitor the ambient temperature of a Central Processing Unit (CPU) in a Personal Computer (PC) so that corrective action can be taken should the ambient temperature of the CPU rise above a predetermined threshold into a temperature band where damage to, or inefficient operation of, the CPU will result.

Typical Integrated Circuit (IC) solutions for sensing temperature change use a semiconductor temperature sensor manufactured, entirely on the IC. The semiconductor temperature sensor can be a forward-biased pn junction diode or variations thereof as is known in the art, such as a diode connected npn or pnp bipolar transistor. For a forward-biased pn junction diode, the relationship between current (I) and voltage (V) (the I–V relationship) is closely approximated by the following expression:

$$I = I_s(e^{\frac{V}{nV_T}} - 1)$$

where:

$I_s$ is normally called the saturation current and is directly proportional to the cross-sectional area of the diode pn junction;

n is the diode ideality factor (assumed hereinafter to be equal to 1), and $V_T$ is the thermal voltage, given by:

$$V_T = \frac{kT}{q}$$

where:
k=Boltzmann constant
T=temperature in degrees Kelvin
q=electronic charge

The temperature dependence of such a forward-biased diode is well known. At a given constant current, the voltage drop across the diode decreases by around 2 mV for every 1° C. increase in temperature, owing to the dependence of $I_s$ and $V_T$ on temperature.

The known ICs exploiting the above described voltage-temperature dependence of diodes typically comprise a pair of parallel circuit branches each having a forward-biased pn junction diode, each pn junction having a different cross-sectional area and therefore a different saturation current, $I_s$. In use, both circuit branches are held at a constant, equal current by separate biased current sources so that the voltage drops across both diodes differ. The diodes are each coupled to an output stage comprising bipolar transistors arranged so as to determine a ratio of voltage drops, each voltage drop being across each diode in each branch. Since the respective voltage drops across each of the two diodes change with ambient temperature, a voltage corresponding to the ambient temperature can be generated by the output stage, and an amplified output signal can be generated by the output stage for communication to, for example, a control circuit that controls a device for adjusting the IC temperature. This method of temperature sensing is known in the art as the kT/q method or the $V_T$ current density method.

However, such circuits suffer from the disadvantage that measurement errors of the diode voltage can result from a drawing of current from the diodes by base terminals of the bipolar transistors of the output stage. In order to mitigate such measurement errors additional current compensation circuitry must be employed together with substantial calibration of the amplified output signal generated by the output stage. Furthermore, in order to maintain an equal, constant current through each of the circuit branches in the event of, for example, fluctuations in the amplitude of the supply voltage, additional biasing circuitry must be employed as an input stage to the diodes. Such additional circuitry takes up valuable IC space and adds to the costs and complexity of the IC manufacture.

SUMMARY OF THE INVENTION

According to a first aspect of the present invention, there is provided a temperature sensor apparatus comprising: a first circuit branch comprising a first semiconductor device having a first pn junction coupled to a first current source; a second circuit branch comprising a second semiconductor device having a second pn junction coupled to a second current source, the first and second semiconductor devices having different saturation currents associated therewith; an amplification stage having a high-impedance input stage coupled across each of the first and second pn semiconductor junctions, and a high-impedance transistor output stage coupled to a first load for generating an amplified output signal corresponding to a substantially same temperature of the first and second semiconductor devices.

The high-impedance input stage has an input impedance of at least an order of magnitude greater than the impedance of the source driving the input stage and typically has an input impedance substantially greater than an order of magnitude since in the preferred embodiment, the stage input impedance is at the gate electrode of at least one Field Effect Transistor device. A high quality metal oxide semiconductor field effect transistor (MOSFET) typically would have an input impedance of about $10^6$ times greater than the impedance of the driving source including the pn junction.

The first circuit branch may be in parallel to the second circuit branch. More preferably, the first circuit branch and the second circuit branch may each comprise an additional pn semiconductor device having a respective semiconductor junction.

The high-impedance transistor output stage may comprise a n-type FET and a p-type FET coupled to an impedance, the impedance being coupled in series to the first load. The cross-sectional areas of the pn semiconductor junctions may be matched. The cross-sectional areas of the pn semiconductor junctions of the first circuit branch $D1_{area}$, $D2_{area}$ may even be matched to the cross-sectional areas of the pn semiconductor junctions of the second circuit branch $D3_{area}$, $D4_{area}$ such that $$\frac{D1_{area}}{D3_{area}} = \frac{D4_{area}}{D2_{area}}$$

An impedance of the first circuit branch may be coupled to an impedance of the second circuit branch to form a joined pair of impedances. The joined pair of impedances may be coupled to a voltage supply rail or to a ground rail.

A second load may be coupled between the high-impedance transistor output stage and a ground rail.

In one embodiment of the invention, a self-biasing circuit for current matching between a pair of parallel circuit branches comprises a first circuit branch having a first pair of pn semiconductor junctions coupled in a series to a first impedance and a second circuit branch having a second pair of pn semiconductor junctions coupled in series to a second impedance, the circuit branches having a potential difference applied there across; wherein the cross-sectional areas of the pn semiconductor junctions are matched.

Therefore, by employing an amplification stage having a high impedance input stage coupled across the pn semiconductor devices, comparatively little or no current is drawn from the first and second circuit branches. The currents respectively flowing through the pn semiconductor devices are therefore not affected. Consequently, measurement of the voltage drops across both pn junction devices is not impaired. Furthermore, by employing a high impedance output stage coupled to a load, the amplified output signal is also not impaired, because substantially no current is drawn away from the pn semiconductor devices or the high impedance input stage. Additionally, since the amplified output signal is conveniently referenced to ground, the need for additional base current compensation circuitry and calibration is therefore reduced.

The currents of the parallel current branches are therefore equalized by the circuit topology, thereby reducing a need to provide a separate current biasing stage for the semiconductor devices. The self biasing circuit can therefore accommodate fluctuations in supply voltage amplitude in order to maintain equal currents through each branch.

BRIEF DESCRIPTION OF THE DRAWING

At least one embodiment of the present invention will now be described, by way of example only, with reference to the accompanying drawing, in which:

The sole FIGURE is a schematic diagram of a temperature sensor apparatus according to the present invention.

DESCRIPTION OF THE PREFERRED EMBODIMENTS

Referring to the sole FIGURE, a temperature sensor apparatus 10 comprises a voltage supply rail 12 coupled to a first terminal of a first, 40 kΩ, resistor 14 (R1), the second terminal of which is coupled to an anode terminal of a first pn semiconductor diode 16 (D1). A cathode terminal of the first diode 16 is coupled to an anode terminal of a second pn semiconductor diode 18 (D2), a cathode terminal of which is coupled to a first terminal of a second, 40 kΩ, resistor 20 (R2). A second terminal of the second resistor 20 is coupled to a ground rail 22. The first resistor 14, first diode 16, second diode 18 and second resistor 20 form a first circuit branch connected between the voltage supply rail 12 and the ground rail 22.

A first terminal of a third, 40Σ, resistor 24 (R3) is coupled to the voltage supply rail 12, the second terminal of which is coupled to an anode terminal of a third pn semiconductor diode 26 (D3). A cathode terminal of the third diode 26 is coupled to an anode terminal of a fourth pn semiconductor diode 28 (D4), a cathode terminal of which is coupled to a first terminal of a fourth, 40Σ, resistor 30 (R4). A second terminal of the fourth resistor 30 is coupled to the ground rail 22. The third resistor 24, third diode 26, fourth diode 28 and fourth resistor 30 form a second circuit branch connected between the voltage supply rail 12 and the ground rail 22 that is connected in parallel with respect to the first circuit branch. The first and second circuit branches are referred to hereinafter as first and second parallel circuit branches respectively. Thus, resistor 14 and diode 16 form a first current source while, while resistor 24 and diode 26 form a second current source.

In the present embodiment, the cross-sectional area of the pn junction of the first diode 16 is eight times greater than the cross-sectional area of the pn junction of the second diode 18 and the cross-sectional area of the pn junction of the third diode 26 is eight times less than the cross-sectional area of the pn junction of the fourth diode 28. Furthermore, the pn junction cross-sectional areas of the four diodes 16, 18, 26, 28 are matched such that the pn junction cross-sectional area of the first diode 16 is equal to the pn junction cross-sectional area of the fourth diode 28, and the pn junction cross-sectional area of the second diode 18 is equal to the pn junction cross-sectional area of the third diode 26.

A non-inverting input terminal of a first operational amplifier 32 is coupled to the cathode terminal of the first diode 16 and, hence, the anode terminal of the second diode 18. The first operational amplifier 32 is a biCMOS operational amplifier having Field Effect Transistors (FETs) at both the non-inverting and an inverting input terminals. The inverting input terminal of the first operational amplifier 32 is coupled to a source terminal of an NMOS FET 34 and a first terminal of a fifth, 4 kΩ, resistor 36 (R5). An output terminal of the first operational amplifier 32 is coupled to a gate terminal of the NMOS FET 34, a drain terminal of which is coupled to the voltage supply rail 12.

A non-inverting input terminal of a second operational amplifier 38 is coupled to the cathode terminal of the third diode 26 and, hence, the anode terminal of the fourth diode 28. The second operational amplifier 38 is also a biCMOS operational amplifier having FETs at both the non-inverting and an inverting input terminals. The inverting input terminal of the second operational amplifier 38 is coupled to a second terminal of the fifth resistor 36 and a drain terminal of a PMOS FET 40. An output terminal of the second operational amplifier 38 is coupled to a gate terminal of the PMOS FET 40. A source terminal of the PMOS FET 40 is coupled to a first terminal of a first, 60 kΩ, load resistor 42 (R6), the second terminal of which is coupled to the ground rail 22. The first operational amplifier 32, the second operational amplifier 38, the NMOS FET 34, the PMOS FET 40, the fifth resistor 36 and the first load resistor 42 together constitute an amplification stage.

In operation, a voltage is applied across the first parallel circuit branch and the second parallel circuit branch by virtue of the voltage supply rail 12 and the ground rail 22. In order to ensure that an equal current flows through the first circuit branch and the second circuit branch, the four diodes 16, 18, 26, 28 of the first and second parallel circuit branches have a matched diode ratio. In this embodiment, the matched diode ratio is defined as:

$$\frac{D1_{area}}{D3_{area}} = \frac{D4_{area}}{D2_{area}}$$

where $D1_{area}$, $D2_{area}$, $D3_{area}$, and $D4_{area}$ are defined as the pn junction cross-sectional areas of the first diode 16, second diode 18, third diode 26 and fourth diode 28, respectively. Without the first and third diodes 16, 26, a difference, i.e. an error, between the currents flowing through the first and second branches occurs due to differences in voltages across the second and fourth resistors 20, 30 brought about by differences in voltages across the second and four diodes 18, 28 as a result of the differences in cross-sectional areas between the second and fourth diodes 18, 28. The first and third diodes 16, 26 are therefore provided so as to generate an equal an opposite voltage to the differences in voltages across the second and fourth diodes 18, 28.

Consequently a current of, for example, 24 μpA flows through each circuit branch. The four diodes 16, 18, 26 and 28 are therefore forward-biased, a first current, i1, flowing through the second diode 18 of the first parallel circuit branch and a second current, i2, flowing through the fourth diode 28 of the second parallel circuit branch. It should also be appreciated that in the event of a fluctuation in the amplitude of the voltage applied across the first and second parallel circuit branches, the use of the first and third diodes 16, 26 serves to self-bias the parallel circuit branches. Consequently, a change in the amplitude of current flowing through each parallel circuit branch also occurs, thereby obviating the need for a separate current biasing stage at an input to the parallel circuit branches.

As mentioned above, the cross-sectional area of the pn junction of the fourth diode 28 is eight times greater than the pn junction cross-sectional area of the second diode 18 and $I_s$ therefore subject to eight times the saturation current, IS. Where $V_{D2}$ is the junction voltage drop across the second diode 18 and $V_{D4}$ is the junction voltage drop across the fourth diode 28, the first and the second currents i1, i2 can be expressed as:

$$i1 = I_s(e^{\left(\frac{V_{D2}}{V_T}\right)} - 1)$$

$$i2 = 8I_s(e^{\left(\frac{V_{D4}}{V_T}\right)} - 1)$$

The ratio of the first current, i1, flowing through the second diode 18 to the second current, i2, flowing through the fourth diode 28 is therefore:

$$\frac{i1}{i2} = \frac{I_s e^{\left(\frac{V_{D2}}{V_T}\right)}}{8I_s e^{\left(\frac{V_{D4}}{V_T}\right)}}$$

Given that the first and the second currents i1, i2 are equal, the above ratio simplifies to:

$V_T \ln 8 = V_{D2} - V_{D4}$.

The voltage drop across the second diode 18 and the second resistor 20 relative to ground is applied to the non-inverting terminal of the first operational amplifier 32, and the voltage drop across the fourth diode 28 and the fourth resistor 30 relative to ground is applied to the non-inverting terminal of the second operational amplifier 38. As the second resistor 20 and the fourth resistor 30 are of substantially equal resistances, the voltage drop across each of them is also equal when the first and the second currents i1, i2 are equal. Consequently, in the present case the voltage applied to the first and second operational amplifiers 32, 38 can be considered to correspond to the voltage drop, $V_{D4}$ across the second diode 18 and the voltage drop, $V_{D2}$ across the fourth diode 28 respectively.

Should current be drawn from the first or second parallel circuit branches by the first and/or second operational amplifiers 32, 38, the accuracy of the ratio of the first current, i1, to the second current, i2, will be affected. Consequently, the use of operational amplifiers 32, 38 having high impedance inputs, for example FETs, such as biCMOS FETs coupled to their input terminals substantially avoids such currents being drawn by the first and/or second operational amplifiers 32, 38.

Consequently, the potential, $V_{D2}$, at the non-inverting input terminal of the first operational amplifier 32 is reproduced at the first terminal of the fifth resistor 36 and the potential $V_{D4}$, at the non-inverting input terminal of the second operational amplifier 38 is reproduced at the second terminal of the fifth resistor 36 by way of the NMOS FET 34 and the PMOS FET 40 respectively without drawing enough current from the first and second circuit branches to affect the accuracy of the temperature measurement. The NMOS and PMOS FETs 34, 40 together constitute a FET output stage of the amplification stage. As such, the voltage across the fifth resistor 36 is $V_{D2} - V_{D4}$ which, as deduced above, is equivalent to $V_T \ln 8$.

An output signal is obtained as a voltage across the first load resistor 42 and is therefore given by:

$$\text{Output voltage} = \frac{R6}{R5} \ln 8 \frac{k}{q} T$$

The output signal is communicated to an output stage (not shown). The output stage can be, for example, an analogue multiplexer configured to measure a voltage supply to ground value for calibration purposes so as to improve the accuracy of the output signal.

The temperature sensor apparatus 10 can be calibrated by measuring the output signal at a known temperature, for example, at room temperature, such as 21° C.

In an alternative arrangement of the temperature sensor apparatus 10, the first terminal of the second resistor 20 is coupled to the first terminal of the fourth resistor 30 so as to form a first joined pair of resistances. Alternatively, or additionally with sufficiently accurate control of the supply voltage, the second terminal of the first resistor 14 is coupled to the second terminal of the third resistor 24 to form a second joined pair of resistances. The first joined pair of resistances can be short circuited to the voltage supply rail 12 and/or the second joined pair of resistances can be short circuited to the ground rail 22.

In operation, the presence of the first joined pair of resistances results in the first and second parallel circuit branches "seeing" a single resistance. Consequently, any errors in values of the second and fourth resistors 20, 30 due to manufacturing imperfections are overcome by effectively averaging the resistance values of the second and fourth resistors 20, 30 with respect to the first and second circuit branches. The same principle applies to the second joined pair of resistances. Compensation for the majority of voltage errors in the first and second parallel circuit branches brought about by resistor mismatches can therefore be made.

Additionally or alternatively to the above arrangement, a first terminal of a second load resistor 44 can be coupled to the source terminal of the NMOS FET 34 and the first terminal of the fifth resistor 36, the second terminal of the second load resistor 44 being coupled to the ground rail 22.

In operation, current is drawn from the NMOS FET 34 so that the current drawn has a well defined DC path to ground. Use of the second load resistor 44 therefore helps to damp out any oscillations or noise in the temperature sensor apparatus 10.

It should be appreciated by those skilled in the art that, throughout the description, the term semiconductor pn junction diode is intended to include any type of suitable semiconductor material and configuration, for example, an npn bipolar transistor being diode connected. Additionally, any reference to component values should be understood as being purely for exemplary purposes. It should also be appreciated that the first load resistor 42 can be coupled between the voltage supply rail 12 and the drain terminal of the NMOS FET 34 instead of between the source terminal of the PMOS FET 40 and the ground rail 22. In such an arrangement, the output signal is still taken as the voltage across the first load resistor 42, the second load resistor 44, if required, having the first terminal thereof coupled to the drain terminal of the PMOS FET 40 and the second terminal of the second load resistor 44 being coupled to the voltage supply rail 12.

I claim:

1. A temperature sensor circuit comprising:
   first and second opposite voltage supply rails;
   a first branch including first and second series connected diodes having pn junctions with predetermined areas D1 and D2, respectively;
   a second branch including third and fourth series connected diodes with predetermined areas D3 and D4, respectively;
   where $$\frac{D1}{D3} = \frac{D4}{D2},$$

and D1≠D2,
   the first and second branches including resistors connected to supply current flowing between the rails to the first, second, third and fourth diodes, the diodes being poled to be forward biased in response to power being applied across the rails, the diodes and resistors of the branches being connected to the rails so a first current flows through the first and second diodes and a second current flows through the third and fourth diodes in response to power being applied across the rails, the first and second branches respectively including first and second taps between the first and second diodes and between the third and fourth diodes;
   first and second operational amplifiers having (a) first and second opposite polarity input terminals respectively connected to be responsive to the voltage at the first and second taps and (b) first and second output terminals, respectively; and
   a third branch including (a) a first field effective transistor of a first conductivity type having a gate electrode connected to be responsive to voltage at the first output terminal and a first source drain path, (b) a second field effect transistor of a second conductivity type having a gate electrode connected to be responsive to the voltage at the second output terminal and a second source drain path connected in series with first source drain path, the third branch including a resistive element connected in series with the first and second source drain paths, the third branch being connected across the first and second voltage supply rails, the resistive element being connected in the third branch so an output signal derived in response to current flowing in the resistive element in response to power being supplied to the first and second rails is determined by the temperature of the circuit.

2. The circuit according to claim 1, wherein the resistors of the first and second branch include:
   (a) first and second resistors of the first branch respectively connected between the first supply rail and an electrode of a first polarity of the first diode, and between the second supply rail and an electrode of a second polarity of the second diode, and
   (b) third and fourth resistors of the second branch respectively connected between the first supply rail and an electrode of the first polarity of the third diode, and between the second supply rail and an electrode of the second polarity of the fourth diode.

3. The circuit according to claim 2, wherein the first and second resistors are connected to the first and second diodes so all the current flowing through the first resistor flows only through the first diode and all the current flowing through the second resistor flows only through the second diode.

4. The circuit according to claim 3, wherein the third and fourth resistors are connected to the third and fourth diodes so all the current flowing through the third resistor flows only through the third diode and all the current flowing through the fourth resistor flows only through the fourth diode.

5. The circuit according to claim 1, wherein the resistors of the first and second branches include a first resistor connected between the first supply rail and first polarity electrodes of the first and third diodes.

6. The circuit according to claim 1, wherein the resistors of the first and second branches include a second resistor connected between the second supply rail and second polarity electrodes of the second and fourth diodes.

7. The circuit according to claim 1, wherein the resistive impedance includes a first resistor connected therebetween the first and second source drain paths and a second resistor connected between one of the source drain paths and one of the supply rails.

8. The circuit according to claim 7, further including a further resistor for damping oscillations, the further resistor being connected in shunt with to the first resistor.

9. The circuit according to claim 1, wherein D1=D4 and D2=D3.

10. The circuit according to claim 1, wherein D1=8×D2 and D4=8×D3.

* * * * *